United States Patent
Fujino et al.

(10) Patent No.: US 7,410,510 B2
(45) Date of Patent: Aug. 12, 2008

(54) PROCESS OF PRODUCING ACTIVATED CARBON FOR ELECTRODE OF ELECTRIC DOUBLE LAYER CAPACITOR

(75) Inventors: Takeshi Fujino, Saitama (JP); Shushi Nishimura, Okayama (JP)

(73) Assignees: Honda Motor Co., Ltd., Tokyo (JP); Kuraray Chemical Co., Ltd., Okayama (JP)

( * ) Notice: Subject to any disclaimer, the term of this patent is extended or adjusted under 35 U.S.C. 154(b) by 257 days.

(21) Appl. No.: 10/571,061

(22) PCT Filed: Sep. 10, 2004

(86) PCT No.: PCT/JP2004/013575

§ 371 (c)(1),
(2), (4) Date: Mar. 8, 2006

(87) PCT Pub. No.: WO2005/027158

PCT Pub. Date: Mar. 24, 2005

(65) Prior Publication Data

US 2007/0026624 A1    Feb. 1, 2007

(30) Foreign Application Priority Data

Sep. 11, 2003    (JP) ............................ 2003-319875

(51) Int. Cl.
*H01G 9/00*    (2006.01)

(52) U.S. Cl. ........... 29/25.03; 361/272; 361/302; 361/311; 361/502; 361/503; 438/253; 438/381; 438/393; 438/396; 257/E21.011; 257/E21.018

(58) Field of Classification Search .......... 361/272, 361/302, 503

See application file for complete search history.

(56) References Cited

U.S. PATENT DOCUMENTS

| | | |
|---|---|---|
| 2002/0027305 A1 | 3/2002 | Kibi et al. |
| 2002/0154467 A1 | 10/2002 | Nakazawa et al. |
| 2003/0043532 A1 | 3/2003 | Noguchi et al. |
| 2003/0139009 A1 * | 7/2003 | Fujino et al. ............. 438/253 |
| 2005/0117275 A1 * | 6/2005 | Fujino et al. ............. 361/502 |

FOREIGN PATENT DOCUMENTS

JP    2004-67498 A    3/2004

* cited by examiner

*Primary Examiner*—Michael S. Lebentritt
*Assistant Examiner*—Kyoung Lee
(74) *Attorney, Agent, or Firm*—Arent Fox LLP

(57) ABSTRACT

A process for producing an activated carbon for an electrode of an electric double-layer capacitor, includes a step of subjecting a carbonized material to an alkali activating treatment, wherein the carbonized material has an average true specific gravity of 1.450 to 1.650 and a variation of the true specific gravities of 0.025 or less.

7 Claims, 7 Drawing Sheets

US 7,410,510 B2

PROCESS OF PRODUCING ACTIVATED CARBON FOR ELECTRODE OF ELECTRIC DOUBLE LAYER CAPACITOR

CROSS-REFERENCE TO RELATED APPLICATION

This application is a National Stage entry of International Application No. PCT/JP2004/013575, filed Sep. 10, 2004, the entire specification claims and drawings of which are incorporated herewith by reference.

TECHNICAL FIELD

The present invention relates to a process for producing activated carbon for the electrodes of electric double bond capacitors.

BACKGROUND ART

The present applicants filed an application for a patent relating to activated carbon of this kind whose BET specific surface area and pore volume were specified, respectively, (JP Application No. 2003-150869) prior to the present application.

However, the present inventors further studied intensively the above-described related techniques and found that the techniques had no problem in capacitance, but required further improvement in durability.

DISCLOSURE OF THE INVENTION

An object of the present invention is to provide a process for producing activated carbon having excellent durability and maintaining high capacitance over a long period of time.

In order to achieve the above-described object, the invention provides a process for producing activated carbon for the electrodes of electric double layer capacitors wherein a carbonized material that has an average true specific gravity ($M_G$) of $1.450 \leq M_G \leq 1.650$ and a variation (r) of true specific gravities of $r \leq 0.025$ is used in production of activated carbon for the electrodes of electric double layer capacitors by subjecting the carbonized material to an alkali activating treatment.

BRIEF DESCRIPTION OF THE DRAWINGS

FIG. 4 is a view from the direction that arrow 4 of FIG. 1 points at.

FIG. 5 is a view from the direction that arrow 5 of FIG. 1 points at.

BEST MODE FOR CARRYING OUT THE INVENTION

Figure 4:
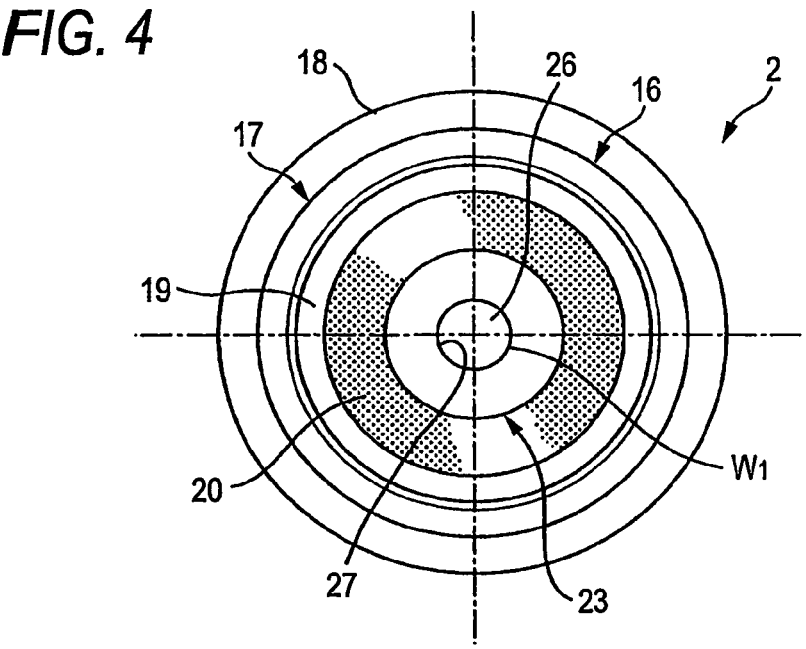
Figure 5:
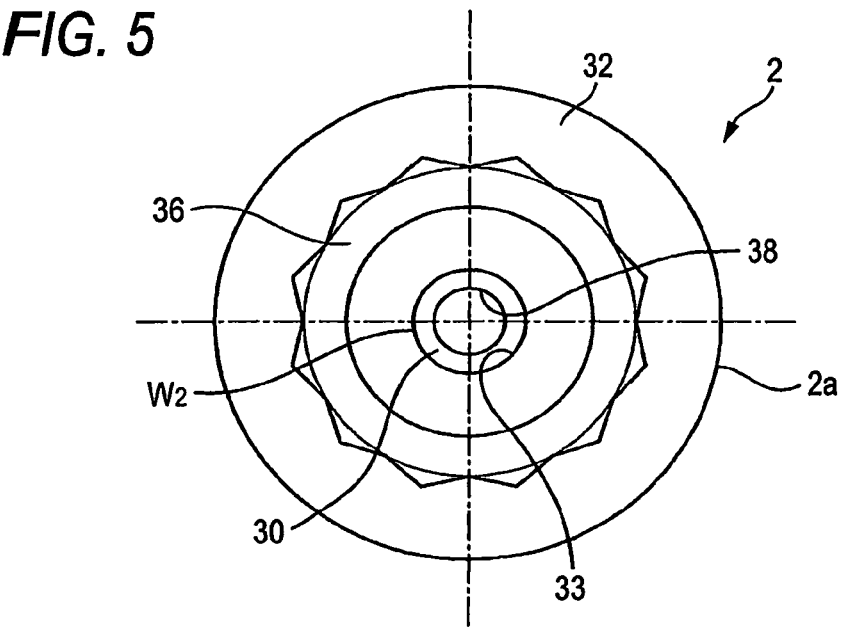
Figure 6:
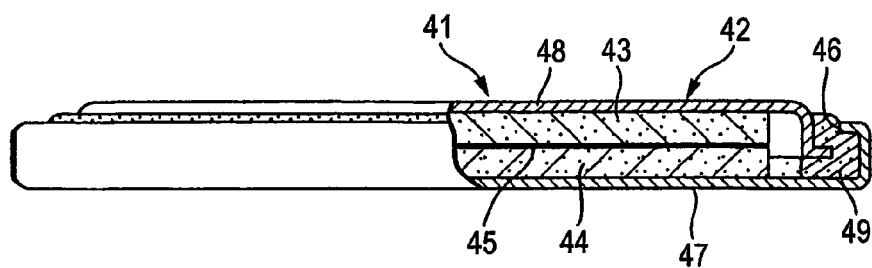
FIG. 6 is a longitudinal front view of essential parts of a button-type electrical double layer capacitor.

A cylinder-type electric double layer capacitor and a button-type electric double layer capacitor that are objects of application of the invention are shown in FIG. 1 to 5 and in FIG. 6, respectively.

Figure 1:
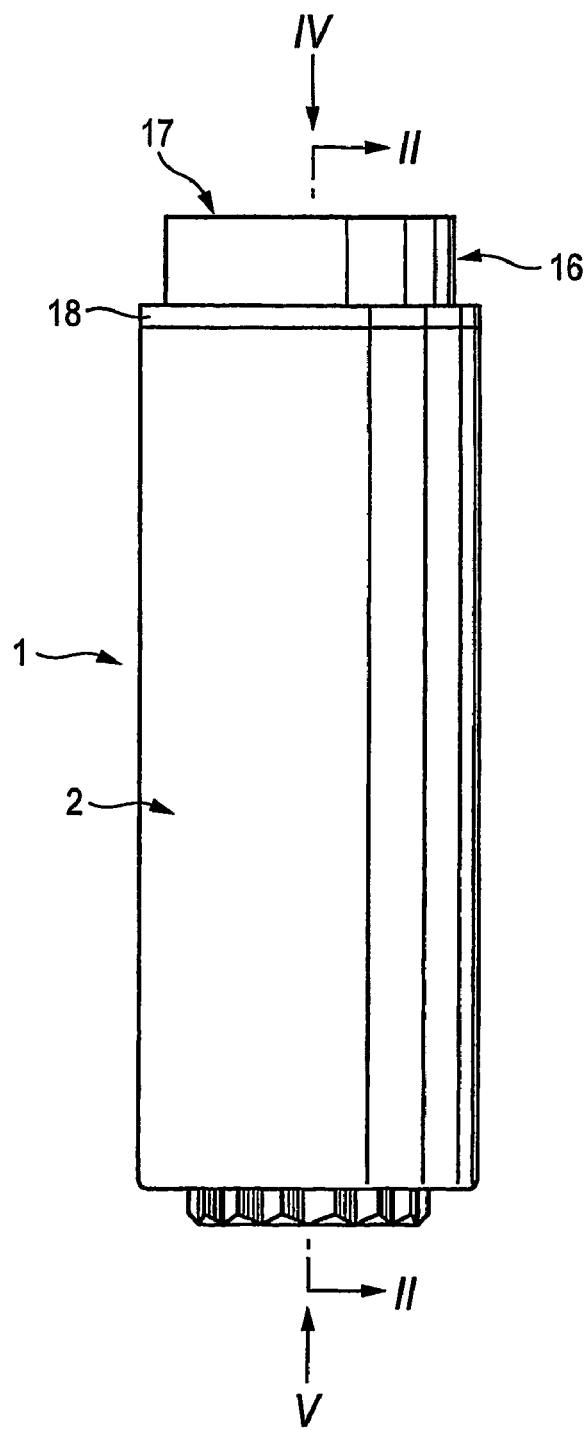
FIG. 1 is a front view of a cylindrical electric double layer capacitor.
Figure 2:
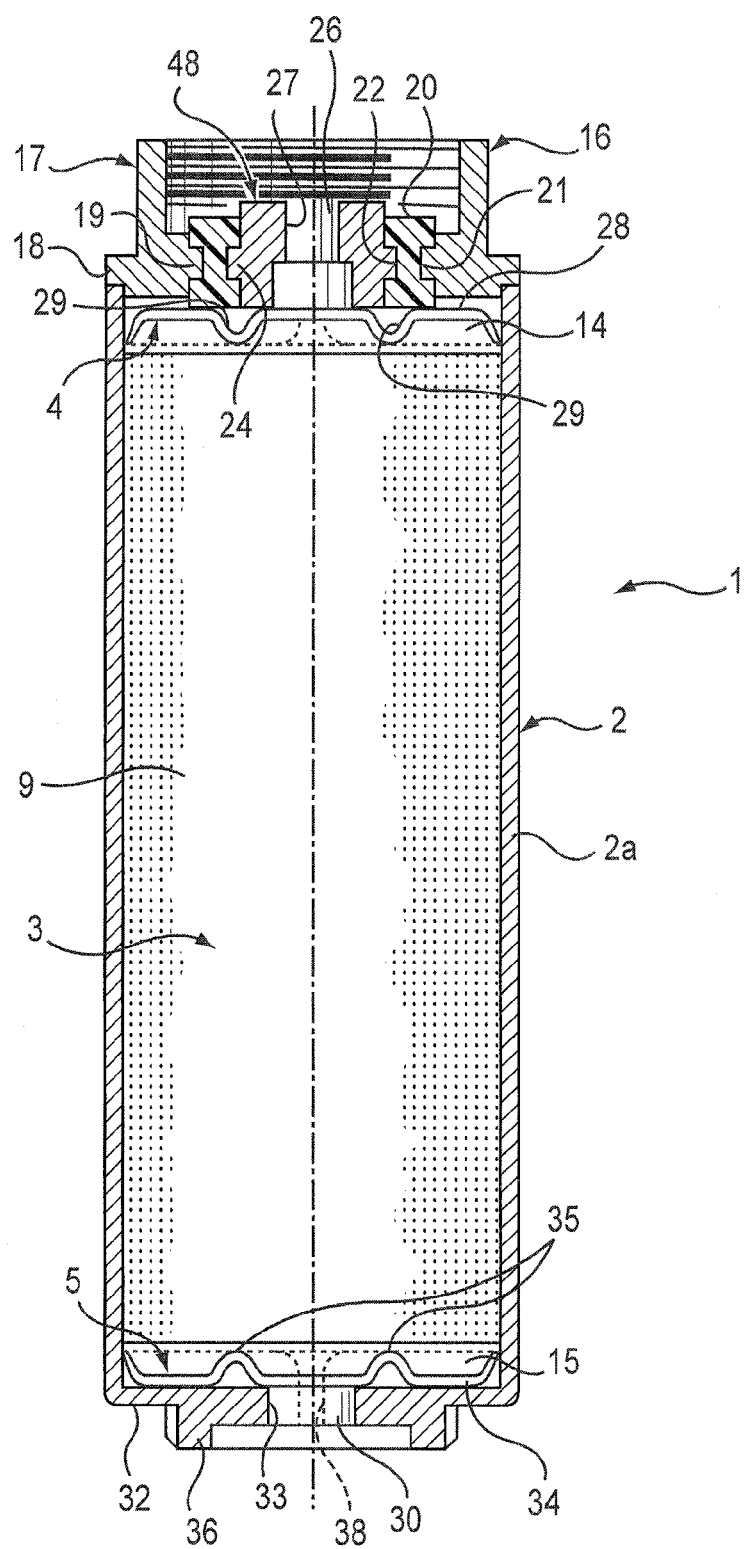
FIG. 2 is a 2-2 line sectional view of FIG. 1.
Figure 3:
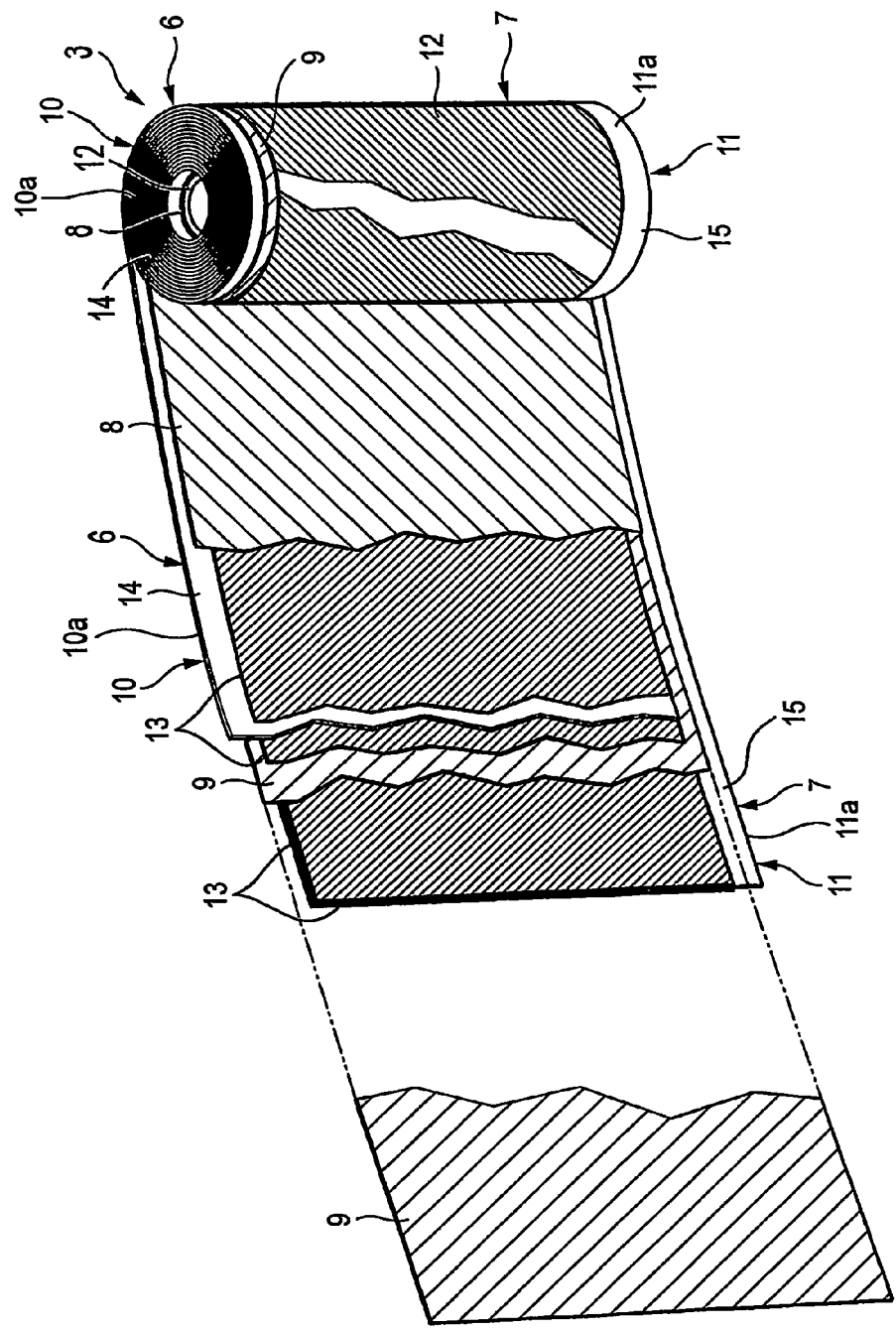
FIG. 3 is a diagonally cutaway view of essential parts for illustrating the structure of an electrode roll body.

In FIG. 1 and 2, cylinder-type electric double layer capacitor 1 has cylindrical closed vessel 2, and the closed vessel 2 contains electrode roll body 3, two disk-shaped collector plates 4 and 5, and an electrolytic solutions The constitution of electrode roll body 3 is as follows. That is, as shown in FIG. 3, the electrode roll body comprises band positive electrode 6, band negative electrode 7, and two band separators 8 and 9 between which band positive electrode 6 is sandwiched in examples, and a piled material where one edge portion 10a along the longitudinal direction of band collector foil 10 made of aluminum in band positive electrode 6 and the other edge portion 11a along the longitudinal direction of band collector foil 11 made of aluminum in band negative electrode 7 project from both edge portions along the longitudinal direction of both band separators 8 and 9, respectively, is spirally rolled around core 12 made of aluminum so that band separator 8 in the inside of band positive electrode 6 exists in the most inner side. Herein, the other band separator 9 existing between band positive electrode 7 and band negative electrode 8 extends from the end edge of band negative electrode 7 by almost one roll length to cover the most outer periphery of band negative electrode 7.

In band positive electrode 6 and band negative electrode 7, a pair of polarized electrodes 13 is laminated to both sides of band collector foils 10 and 11 thereof, respectively. However, in the collector foils 10 and 11, no electrodes exist on the above-described one and the other edge portions 10a and 11a projecting from both separators 8 and 9 along the longitudinal direction, and both edge portions 10a and 11a form joint portions 14 and 15 to collector plates 4 and 5 by rolling up.

As shown in FIG. 1, 2, and 4, closed vessel 2 comprises closed-end cylindrical body 2a made of aluminum and capping body 16 closing the opening thereof. Capping body 16 is constituted as follows. Capping body 16 has short cylindrical body 17 made of an aluminum alloy, the one edge part thereof is fitted to the opening of cylindrical body 2a, and circular projecting portion 18 existing in the outer periphery adjacent to the one edge portion is laser welded to cylindrical body 2a. Further, groove 21 on outer periphery of circular plate 20 made of electrical insulating resin is fitted to circular projecting portion 19 existing in the inner periphery adjacent to one edge portion of short cylindrical body 17, and circular projecting portion 24 existing in the outer periphery of cylindrical positive electrode terminal 23 made of an aluminum alloy is fitted to groove 22 on inner periphery of circular plate 20.

In one disk-shaped collector plate 4 made of an alloy of aluminum, boss 26 existing in the center thereof is inserted into central hole 27 of cylindrical positive electrode terminal 23 and is laser welded thereto. Disk portion 28 has plural concave grooves 29 that are arranged radially, project downward, and form U-shape in a sectional view, and joint portion 14 of band positive electrode 6 is laser welded to the bottoms of concave grooves 29 in a crushed condition.

In the other disk-shaped collector plate 5 made of an aluminum alloy, boss 30 existing in the center thereof is inserted into central hole 33 existing in the bottom wall of closed-end cylindrical body 2a that is negative electrode terminal 32 as shown in FIG. 5 and is laser welded thereto. Disk portion 34 has plural convex grooves 35 that are arranged radially, project upward, and form reverse U-shape in a sectional view, and joint portion 15 of band negative electrode 7 is laser welded to the ridgeline portion of those convex grooves 35 in a crushed condition in the same manner as described above. Circular projecting portion 36 surrounding central hole 33 exists on the outer surface of the bottom wall.

Both disk portions 28 and 34 of collector plate 4 of the positive electrode side and collector plate 5 of the negative electrode side have the same shape, and through-holes (not shown in the figure) are formed between both adjacent concave grooves 29 and between both adjacent convex grooves 35 to allow an electrolyte to pass. The electrolyte is poured into closed vessel 2 from opening 38 formed in boss 30 of disk-shaped collector plate 5 of the negative electrode side, and thereafter opening 38 is closed by a rubber stopper (not shown in the figure).

In FIG. 6, button-type electric double layer capacitor 41 has case 42, a pair of polarized electrodes 43 and 44 contained in case 42, spacer 45 placed between the electrodes, and an electrolyte filled in case 42. Case 42 comprises vessel body 47 made of aluminum that has opening portion 46 and capping plate 48 made of aluminum that closes opening portion 46, and the outer periphery portion of capping plate 48 and the inner periphery portion of vessel body 47 are sealed up with sealing material 49.

In a process for producing activated carbon for the polarized electrodes, the following processes are carried out successively: a process of forming a raw carbon material into fibers by spinning or into powder by pulverization, a process of subjecting the raw carbon material to an oxygen crosslinking treatment, a process of subjecting the raw carbon material having undergone the oxygen crosslinking treatment to a carbonization treatment to obtain a carbonized material, a process of subjecting the carbonized material to a pulverization treatment, and a process of subjecting the carbonized material having undergone the pulverization treatment to an alkali activating treatment and then to washing, filtration, and drying to obtain activated carbon.

Easily graphitizable raw carbon materials are used as the raw carbon materials, and examples of such raw carbon materials include synthesized mesophase pitch, petroleum mesophase pitch, coal mesophase pitch, petroleum coke, coal coke, petroleum pitch, polyvinyl chloride, polyimide, PAN, and the like. The pulverization of the raw carbon materials is carried out according to general methods. Then, a ball mill, a jet mill, a high-speed revolution mill, or the like is used.

The oxygen crosslinking treatment is carried out to crosslink the respective benzene rings of adjacent two polycondensed aromatic compounds of raw carbon materials through an oxygen atom. This treatment enables carbonization of the raw carbon materials without fusion in the carbonization treatment. In other word, this treatment realizes solid phase carbonization of raw carbon materials. The fusion of the raw carbon materials causes unpreferably re-orientation and simultaneously the condensation of mesogen. In the treatment, the heating temperature (T) was adjusted to $140° C. \leq T \leq 350° C.$ and the heating time (t) to $10^{-3}\ hr \leq t \leq 10\ hr$, respectively. However, it is possible to obtain activated carbon without performing the oxygen crosslinking treatment.

The carbonization treatment is carried out by use of a continuous belting furnace, a continuous system rotary kiln, or the like under an inert atmosphere at a heating temperature (T) of $500° C. \leq T \leq 1000° C.$, more preferably $600° C. \leq T \leq 1000° C.$, and a treating time (t) of $10_{-3}\ hr \leq t \leq 10\ hr$, more preferably $10\ min \leq t \leq 300\ min$. Then, much attention is paid to the uniformity of temperature of an entire raw carbon material by adjusting the temperature of a furnace in particular and thereby carbonized materials are obtained which have average true specific gravities ($M_G$) of $1.450 \leq M_g \leq 1.650$ and a variation (r) of true specific gravities (difference between the maximum value and minimum value of the true specific gravity) of $r \leq 0.025$. In this case, average true specific gravities less than 1.450 fail to improve the capacitance of the electric double layer capacitor because of reduction in density of the electrode formed accompanied by reduced density of the activated carbon. On the other hand, average true specific gravities exceeding 1.650 lead to uneven quality of activated carbon because of uneven penetration of treatments into materials to be carbonized. A variations (r) of the true specific gravities greater than 0.025 brings about wide variability in quality of activated carbon and fail to stabilize the capacitance of the electric double layer capacitor. Use of the continuous belting furnace or the like makes it possible to heighten the productivity of the carbonized materials.

A temperature difference between the upper portion and lower portion of the furnace is preferably from 1° C. to 50° C. and more preferably about 20° C. In addition, the thickness of the fiber aggregate is preferably from 1 cm to 50 cm and more preferably from 3 cm to 20 cm.

For the pulverization treatment, pulverizers such as a ball mill, a jet mill, a high-speed revolution mill (e.g., lavo cutter mill) and the like are used. The average particle diameter (Ad) of a powdery carbonized material is adjusted to $1\ \mu m \leq Ad \leq 50\ \mu m$ and this granulation enables improvement in efficiency of the alkali activating treatment. It also is possible to carry out the pulverization treatment after the alkali activation.

In the alkali activating treatment of the powdery carbonized material, potassium hydroxide, sodium hydroxide or the like can be used as a treatment agent, and the weight ratio of the treatment agent to the powdery carbonized material is from 1.5 to 2.5 and preferably from 1.7 to 2.2. The treatment is carried out in an atmosphere of an inert gas and the heating temperature (T) is adjusted to $600° C. \leq T < 1000° C.$ and preferably $700° C. \leq T \leq 850° C.$ and the treating time (t) to $10_{-3}\ hr \leq t \leq 10\ hr$, respectively. The heating temperature is approximately adjusted to a setting temperature ±10° C. After the alkali activating, the above-described respective operations are carried out to obtain certain activated carbon. In this activated carbon, an ignition ash was of 300 ppm or less at 700° C., a potassium amount found by ICP emission analysis was 200 ppm or less, an oxygen content by elemental analysis was 2 weight percent or less, and a total amount of functional groups by a titration method was 1.0 meq/g or less. In the alkali activating treatment, a heating treatment may be carried out at the prior stage thereof as needed for the purpose of dehydration at a heating temperature (T) of $400° C. \leq T \leq 450° C.$ and a heating time (t) of $10^{-1}\ hr \leq t \leq 10\ hr$.

EXAMPLES

Specific examples are hereinafter illustrated.

A. Examples (1), (2), (3), and (4) of activated carbon were prepared according to the following process.

[I] Preparation of Raw Carbon Material

Spinning was carried out according to a melt blow process by use of 100% optically anisotropic synthetic mesophase pitch to obtain a fibrous material. Subsequently, the fibrous material was piled up to obtain a band fiber aggregate of 5-cm thickness as a raw carbon material.

[II] Oxygen Crosslinking Treatment

The fiber aggregate was placed on a belt conveyor of a wire net made of stainless steel, introduced into a treatment furnace, and subjected to the oxygen crosslinking treatment under the conditions of a supplied oxygen amount of 1500 m³/min, a temperature-rising speed of 20° C./min, and maintaining the treating temperature at 320° C. for 30 min.

[III] Carbonization Treatment

The fiber aggregate was placed on a belt conveyor and allowed to pass through the inside of a continuous belting furnace to carry out the carbonization of the fiber aggregate. Herein, temperature was adjusted so that the temperature of the upper portion of the furnace was 790° C., that of the middle portion of the furnace was 780° C., and that of the lower portion of the furnace was 770° C., respectively, and the treating time was adjusted to 30 min. The temperature of the furnace contains a measurement error of ±0.5° C.

Thus, an aggregate of carbonized material was obtained, and the true specific gravity of a carbonized material in the upper surface side was 1.585, that in almost half position in thickness was 1.570, and that in the lower surface side was 1.560. Accordingly, the average true specific gravity ($M_G$) of the carbonized material is 1.572 and the variation (r) of the true specific gravities is 0.025.

The aggregate of carbonized material was subjected to a pulverization treatment by use of a high-speed revolution mill to obtain a powdery carbonized material having an average particle diameter (Ad) of 15 μm.

[IV] Alkali activating treatment (a) Subsequently, 300 g of the powdery carbonized material and 570 g (1.9-fold amount to the powdery carbonized material in weight) of potassium hydroxide pellets of 85% purity were sufficiently mixed and then the resulting mixture was filled into a cylindrical reactor made of nickel.

(b) The cylindrical reactor was set in an electric furnace, heated at a temperature-rising speed of 200° C./hr in nitrogen stream, and held at 450° C. for 3 hr and subsequently at 730° C. for 3 hr. Then the cylindrical reactor was taken out of the electric furnace and treated powder was cooled to room temperature, formed into slurry with distilled water, and taken out of the cylindrical reactor. Thereafter, washing with warm water of 90° C., washing with hydrochloric acid, filtration, and drying at temperatures lower than 150° C. were successively carried out to obtain example (1) of activated carbon having an average particle diameter (Ad) of 15 μm.

The above-described alkali activating treatment was carried out under similar conditions except that 600 g (two-fold amount to the powdery carbonized material in weight) of the potassium hydroxide pellets was used to obtain example (2) of activated carbon.

Further, the above-described alkali activating treatment was carried out under similar conditions except that 630 g (2.1-fold amount to the powdery carbonized material in weight) of the potassium hydroxide pellets was used to obtain example (3) of activated carbon.

Furthermore, the above-described alkali activating treatment was carried out under similar conditions except that 660 g (2.2-fold amount to the powder carbonized material in weight) of the potassium hydroxide pellets was used to obtain example (4) of activated carbon.

In the carbonization treatment where the above-described continuous belting furnace was used, temperature was adjusted so that the temperature of the upper portion of the furnace was 790° C., that of the middle portion of the furnace was 780° C., and that of the lower portion of the furnace was 770° C., respectively, and the treating time was adjusted to 30 min, thus to obtain an aggregate of carbonized material. The true specific gravity of the carbonized material in the upper surface side of the aggregate of carbonized material was 1.585 similarly to the above-described value, that in almost half position in thickness of the aggregate was 1.570 similarly to the above-described value, and that in the lower surface side of the aggregate was 1.560 similarly to the above-described value. Accordingly, the average true specific gravity ($M_G$) of the carbonized material was 1.572 and the variation (r) of the true specific gravities was 0.025 similarly to the above-described respective values.

B. For comparison, comparative examples (1a), (2a), (3a), and (4a) of activated carbon were prepared according to the following process.

[I] Preparation of Raw Carbon Material

Similarly to the above-described method, spinning was carried out by use of 100% optically anisotropic synthetic mesophase pitch according to a melt blow method to obtain a fibrous material. Subsequently, the fibrous material was piled up to obtain a band fiber aggregate of 5-cm thickness as a raw carbon material.

[II] Oxygen Crosslinking Treatment

Similarly to the above-described method, the fiber aggregate was placed on a belt conveyor of a wire net made of stainless steel, introduced into a treatment furnace, and subjected to an oxygen crosslinking treatment under the conditions of supplied oxygen amount of 1500 m$^3$/min, a temperature-rising speed of 20° C./min, and maintaining a treating temperature at 320° C. for 30 min.

[III] Carbonization Treatment

The fiber aggregate was placed on a belt conveyor and allowed to pass through the inside of the continuous belting furnace to carry out the carbonization of the fiber aggregate. In this case, temperature was adjusted so that the temperature of the upper portion of the furnace was 850° C., that of the middle portion of the furnace was 790° C., and that of the lower portion of the furnace was 740° C., respectively, and the treating time was adjusted to 30 min.

Thus, an aggregate of carbonized material was obtained and the true specific gravity of the carbonized material in the upper surface side thereof was 1.690, that in almost half position in thickness was 1.590, and that in the lower surface side was 1.460. Accordingly, the average true specific gravity ($M_G$) of the carbonized material is 1.580, and the variation (r) of the specific gravities is 0.230, which is high by almost one figure as compared with 0.025 as described above.

Similarly to the above-described method, the aggregate of carbonized material was subjected to the pulverization treatment by use of a high-speed revolution mill to obtain a powdery carbonized material having an average particle diameter (Ad) of 15 μm.

[IV] Alkali activating treatment (a) Similarly to the above-described method, 300 g of the powdery carbonized material and 570 g (1.9-fold amount to the powdery carbonized material in weight) of potassium hydroxide pellets of 85% purity were sufficiently mixed and then the resulting mixture was filled into a cylindrical reactor made of nickel.

(b) The cylindrical reactor was set in an electric furnace, heated in a nitrogen stream at a temperature-rising speed of 200° C./hr, and held at 450° C. for 3 hr and subsequently at 730° C. for 3 hr. Then the cylindrical reactor was taken out of the electric furnace and treated powder was cooled to room temperature, formed into slurry with distilled water, and taken out of the cylindrical reactor. Thereafter, washing with warm water of 90° C., washing with hydrochloric acid, filtration, and drying at temperatures lower than 150° C. were carried out to obtain comparative example (1a) of activated carbon having an average particle diameter (Ad) of 15 μm.

The above-described alkali activating treatment was carried out under similar conditions except that 600 g (two-fold amount to the powdery carbonized material in weight) of the potassium hydroxide pellets was used to obtain comparative example (2a) of activated carbon for electrodes.

Further, the above-described alkali activating treatment was carried out under similar conditions except that 630 g (2.1-fold amount to the powdery carbonized material in weight) of the potassium hydroxide pellets was used to obtain comparative example (3a) of activated carbon for electrodes.

Furthermore, the above-described alkali activating treatment was carried out under similar conditions except that 660 g (2.2-fold amount to the powdery carbonized material in weight) of the potassium hydroxide pellets was used to obtain comparative example (4a) of activated carbon for electrode.

In the carbonization treatment where the above-described continuous belting furnace was used, the temperature was adjusted so that the temperature of the upper portion of the furnace was 850° C., that of the middle portion of the furnace was 750° C., and that of the lower portion of the furnace was 650° C., respectively, and the treating time was adjusted to 30 min, thus to obtain an aggregate of carbonized material. The true specific gravity of the carbonized material in the upper surface side of the aggregate of carbonized material was 1.670, that in almost half position in thickness of the aggregate was 1.550, and that in the lower surface side of the aggregate was 1.390. Accordingly, the average true specific gravity ($M_G$) of the carbonized material was 1.537 and the variation (r) of the true specific gravities was as large as 0.280.

C. Specific Surface Area and Pore Volume of Activated Carbon

The specific surface areas of examples (1) to (4) and comparative examples (1a) to (4a) of activated carbon were determined according to the BET method depending upon nitrogen adsorption and the pore volumes thereof were determined according to the t-plot method.

Table 1 shows the specific surface areas and pore volumes of the examples and the comparative example of activated carbon.

TABLE 1

| Activated Carbon | Specific Surface Area ($m^2$/g) | Pore Volume (ml/g) |
|---|---|---|
| Example (1) | 647 | 0.305 |
| Comparative Example (1a) | 638 | 0.305 |
| Example (2) | 741 | 0.336 |
| Comparative Example (2a) | 728 | 0.335 |
| Example (3) | 795 | 0.351 |
| Comparative Example (3a) | 796 | 0.352 |
| Example (4) | 852 | 0.377 |
| Comparative Example (4a) | 876 | 0.380 |

In order to have high capacitance and durability, activated carbon is desired to have a specific surface area (A) of 1200 $m^2$/g or less and a pore volume (V) of 0.3 ml/g or more. Table 1 reveals that the examples and the comparative examples of activated carbon meet these requirements.

Although example (1) and comparative example (1a), example (2) and comparative example (2a), example (3) and comparative example (3a), and example (4) and comparative example (4a) of activated carbon were prepared from carbonized materials different from each other, respectively, it is found that the specific surface areas and the pore volumes of the respective pairs of examples and comparative examples of activated carbon show almost equal values, respectively.

D-1. Preparation of Cylindrical Electric Double Layer Capacitor Example (1) of activated carbon, carbon black (conductive filler), and PTFE (binding agent) were weighed so as to be 85.6:9.4:5 in weight ratio, then the weighed materials were kneaded, and thereafter the kneaded mixture underwent rolling, thus to prepare an electrode sheet having densities of 0.8 to 1.0 g/ml and a thickness of 150 μm. Two sheets of polarized electrode were cut off from the electrode sheet and example (1) of cylindrical electric double layer capacitor as shown in FIG. 1 to 5 was prepared from these two sheets of polarized electrode. The electrolytic solution used was a 1.8 mole/liter propylene carbonate solution of triethylmethylammonium tetrafluoroborate [$(C_2H_5)_3CH_3NBF_4$]. Examples (2) to (4) and comparative examples (1a) to (4a) of seven cylindrical electric double layer capacitors were prepared from examples (2) to (4) and comparative examples (1a) to (4a) of activated carbon according to the above-described process.

D-2. Preparation of Button-type Electric Double Layer Capacitor

Example (1) of activated carbon, carbon black (conductive filler), and PTFE (binding agent) were weighed so as to be 85.6:9.4:5 in weight ratio, then the weighed materials were kneaded, and thereafter the kneaded mixture underwent rolling, thus to prepare an electrode sheet having densities of 0.8 to 1.0 g/ml and a thickness of 150 μm. Two sheets of polarized electrode were cut off so as to have a diameter of 20 mm from the electrode sheet and example (1) of button-type electric double layer capacitor as shown in FIG. 6 was prepared from these two sheets of polarized electrode, spacer made of PTFE, electrolytic solution and the like. The electrolytic solution used was a 1.8 mole/liter propylene carbonate solution of triethylmethylammonium tetrafluoroborate [$(C_2H_5)_3CH_3NBF_4$]. Examples (2) to (4) and comparative examples (1a) to (4a) of seven button-type electric double layer capacitors were prepared from examples (2) to (4) and comparative examples (1a) to (4a) of activated carbon according to the above-described process.

E. Volume Capacitance Density of Activated Carbon

About examples (1) to (4) and comparative examples (1a) to (4a) provided in button-type electric double layer capacitor, the following charge and discharge cycle was repeated and the capacitance density per unit volume, that is, volume capacitance density (F/$cm^3$) of activated carbon was determined according to the energy conversion process. In the charge and discharge, a constant-current and constant-voltage charge was carried out up to 2.7 V for 90 min and subsequently a constant-current discharge was carried out for 90 min at a current density of 2 mA/$cm^2$ until 0 V.

Table 2 shows the volume capacitance densities (F/$cm^3$) of the examples and the comparative examples of activated carbon.

TABLE 2

| Activated Carbon | Volume Capacitance Density (F/$cm^3$) |
|---|---|
| Example (1) | 32.3 |
| Comparative Example (1a) | 30.5 |
| Example (2) | 33.7 |
| Comparative Example (2a) | 31.5 |
| Example (3) | 33.0 |
| Comparative Example (3a) | 30.1 |
| Example (4) | 32.5 |
| Comparative Example (4a) | 29.5 |

Table 2 reveals that values of the volume capacitance density of the examples of activated carbon are larger than those of the corresponding comparative examples, for example, the value of example (1) is larger than the value of comparative example (1a).

F. Durability Test

A constant voltage of 2.7 V was applied to the examples and comparative examples provided in cylindrical electric double layer capacitor at 25° C. for 24 hr and then the capacitances thereof were determined as initial values. Subsequently, a constant voltage of 2.7 V was applied to the examples and comparative examples of cylindrical electric double layer capacitor in a thermostatic chamber of 45° C. for 48, 200, 400, 800, 1000, and 1200 hrs to determine the capacitance at the elapse of the respective times. Results are shown in Table 3.

TABLE 3

| Electric Double Layer Capacitor | Initial Value | Voltage Applied Time (hr) | | | | | |
|---|---|---|---|---|---|---|---|
| | | 48 | 200 | 400 | 800 | 1000 | 1200 |
| Example (1) | 2035 | 1872 | 1811 | 1730 | 1648 | 1608 | 1587 |
| Comparative Example (1a) | 1922 | 1749 | 1691 | 1614 | 1422 | 1345 | 1326 |
| Example (2) | 2125 | 1976 | 1913 | 1870 | 1806 | 1785 | 1785 |
| Comparative Example (2a) | 1985 | 1806 | 1745 | 1667 | 1508 | 1430 | 1390 |
| Example (3) | 2092 | 1945 | 1882 | 1841 | 1778 | 1757 | 1757 |
| Comparative Example (3a) | 1895 | 1743 | 1649 | 1592 | 1535 | 1497 | 1478 |
| Example (4) | 2048 | 1925 | 1863 | 1822 | 1760 | 1740 | 1740 |
| Comparative Example (4a) | 1859 | 1747 | 1673 | 1635 | 1580 | 1561 | 1560 |
| Capacitance (F) | | | | | | | |

Figure 7:
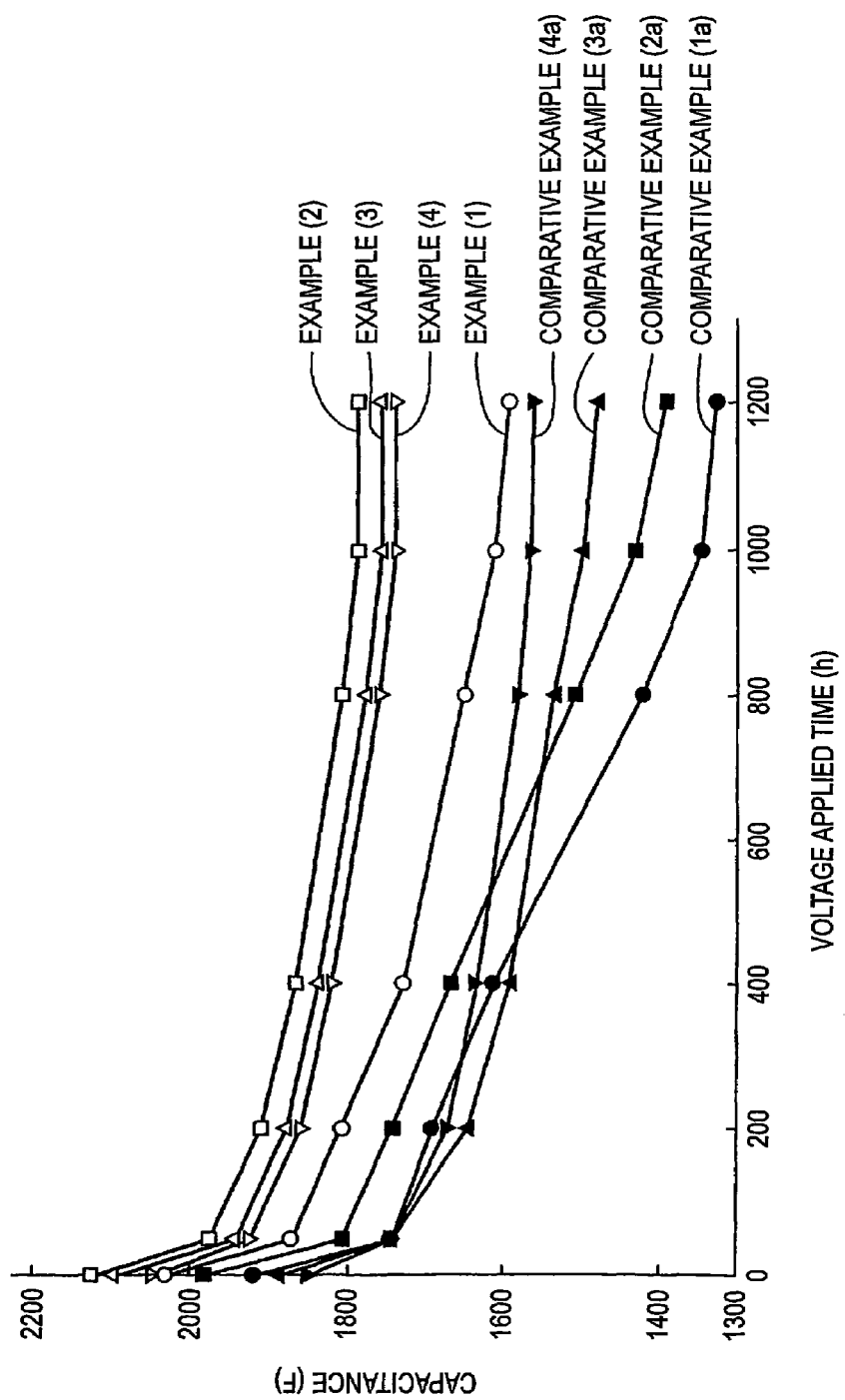
FIG. 7 is a graph demonstrating the relation between the voltage application time and capacitance.

FIG. 7 shows the relation between the voltage applied time and capacitance of the examples and the comparative examples of cylindrical electric double layer capacitor, that is, activated carbon, that is graphed based on Table 3. FIG. 7 reveals that examples (1), (2), and (3) have more excellent durability than the corresponding comparative examples (1a), (2a), and (3a), respectively. About example (4), some improvement in durability is observed as compared with comparative example (4a), though the degree of the improvement is slight.

The maintenance rates of capacitance of the examples and comparative examples of cylindrical electric double layer capacitor were calculated from an equation (found value/initial value)×100(%). Results are shown in Table 4.

TABLE 4

| Electric Double Layer Capacitor | Initial Value | Voltage Applied Time (hr) | | | | | |
|---|---|---|---|---|---|---|---|
| | | 48 | 200 | 400 | 800 | 1000 | 1200 |
| Example (1) | 100 | 92 | 89 | 85 | 81 | 79 | 78 |
| Comparative Example (1a) | 100 | 91 | 88 | 84 | 74 | 70 | 69 |
| Example (2) | 100 | 93 | 90 | 88 | 85 | 84 | 84 |
| Comparative Example (2a) | 100 | 91 | 88 | 84 | 76 | 72 | 70 |
| Example (3) | 100 | 93 | 90 | 88 | 85 | 84 | 84 |
| Comparative Example (3a) | 100 | 92 | 87 | 84 | 81 | 79 | 78 |
| Example (4) | 100 | 94 | 91 | 89 | 86 | 85 | 85 |
| Comparative Example (4a) | 100 | 94 | 90 | 88 | 85 | 84 | 84 |
| Maintenance Rate of Capacitance (%) | | | | | | | |

Figure 8:
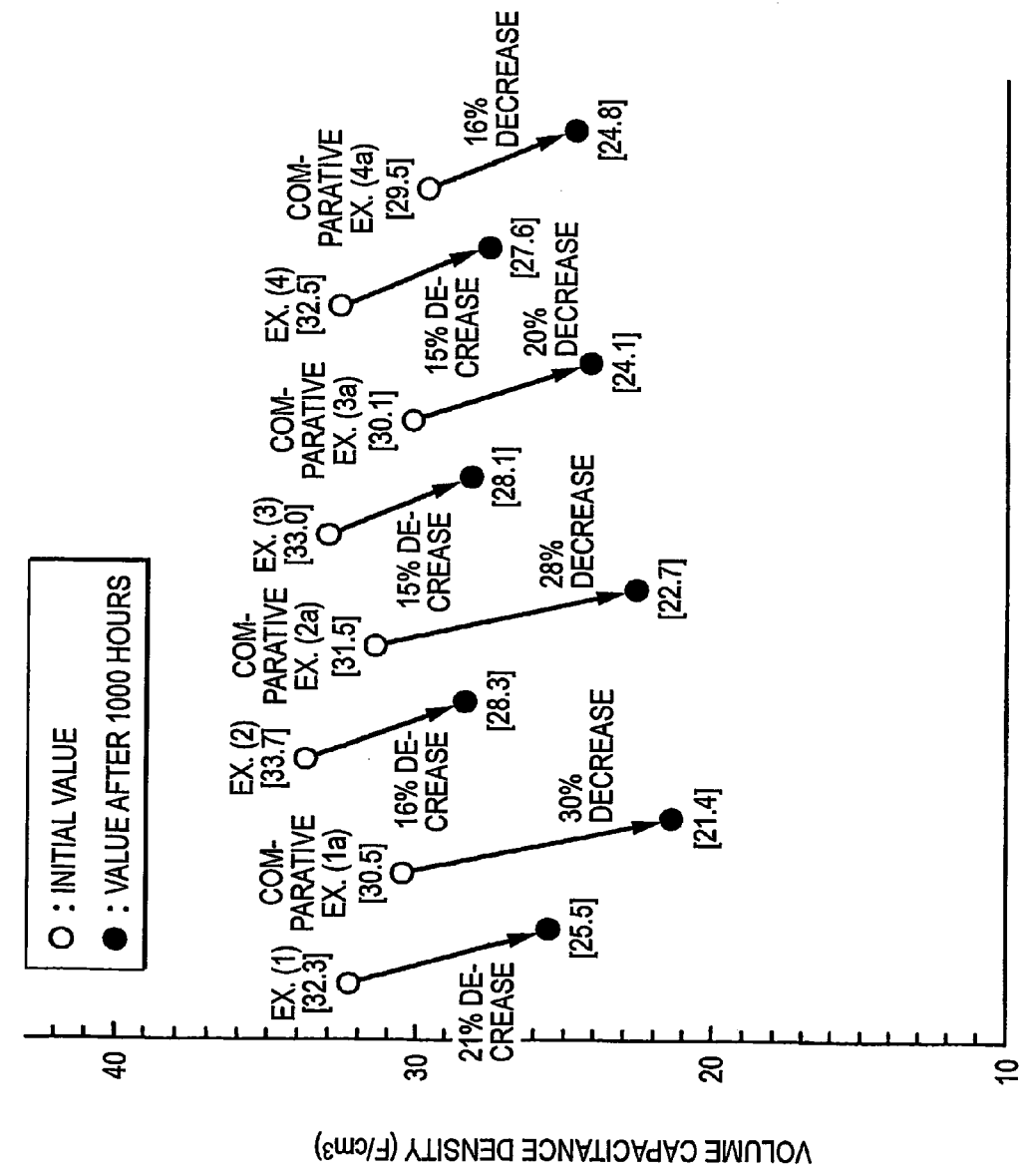
FIG. 8 is a graph demonstrating changes in volume capacitance density.

About examples (1) to (4) and comparative examples (1a) to (4a) of activated carbon, the volume capacitance densities after the elapse of 1000 hr under voltage application were calculated based on Tables 2 and 4, and the relation between the resulting values and the initial values of Table 2 was graphed to obtain FIG. 8. FIG. 8 reveals that examples (1), (2), and (3) have lower decrease ratios of volume capacitance densities and more excellent durability than the corresponding comparative examples (1a), (2a), and (3a), respectively. About example (4), some improvement in durability is observed as compared with comparative example (4a), though the degree of the improvement is slight.

In cylindrical electric double layer capacitor 1, it is possible to produce readily electrode roll body 3 of arbitrary sizes by adjusting the width and length of band positive electrode 6 and band negative electrode 7 and also to improve the filling factor of the activated carbon by increasing rolling strength and compacting band positive electrode 6 and band negative electrode 7. Cylindrical closed vessel 2 is a vessel enhanced in energy density per volume (W·h/l) and the volume fraction of activated carbon to the internal volume of vessel 2 was 44%. The volume change of the vessel depending upon charge and discharge is preferably 1% or less. Components of the vessel include Al, Ti, Mg, Fe, Cr, Ni, Mn, Ca, and Zr or alloys containing at least one of these metals, though not necessarily limited to these metals or alloys. It is possible to form the electric double layer capacitor into a stack type such as cubic or rectangular bodies by pilling plural cells. The constitution like these leads to improvement in volumetric efficiency of a capacitor module as compared with cylindrical vessels.

Electrolytic solutions used are not limited to the above-described ones, but combinations of electrolytes and solvents that enable high concentrations of the electrolytic solutions are desirable. Examples of such electrolytes include quaternary ammonium cations except the above-described cation, pyrrolidinium cations, and ionic liquids such as alkylimidazoliums. Examples of such solvents include cyclic carbonates such as propylene carbonate and ethylene carbonate, chain carbonates, and carbonate derivatives containing halogen atoms (Cl, F, etc.) as substituent groups. The chain carbonates such as dimethyl carbonate, ethyl methyl carbonate, and diethyl carbonate that have small dielectric constants are suitable for solvents for the ionic liquids. These solvents can be used simply or as mixtures thereof.

INDUSTRIAL APPLICABILITY

According to the invention, the adoption of the above-described carbonized material enables preparation of the activated carbon that has excellent durability and can maintain a high capacitance over a long period of time. Electric double layer capacitors having polarized electrodes where the above-described activated carbon is used show durability so that the maintenance rate of capacitance is more than 78 percent even after voltage applicated time reaches 1200 hr in a durability test.

The invention claimed is:

1. A process for producing an activated carbon for an electrode of an electric double-layer capacitor, comprising subjecting a carbonized material to an alkali activating treatment,
   wherein the carbonized material has an average true specific gravity of 1.450 to 1.650 and a variation of the true specific gravity of 0.025 or less.

2. The method according to claim 1, wherein the variation is a difference between a maximum value and a minimum value of the true specific gravity.

3. The method according to claim 1, further comprising subjecting a raw carbon material to a carbonizing treatment so as to form the carbonized material,
   wherein the carbonizing treatment is carried out in a furnace at a heating temperature of 600° C. to 1000° C., and the furnace has a temperature difference between an upper portion and a lower portion of the furnace of 1° C. to 50° C.

4. The method according to claim 3, wherein the temperature difference between the upper portion and the lower portion of the furnace is about 20° C.

5. The method according to claim 4, wherein the carbonizing treatment is carried out for 10 to 300 minutes in the furnace, and the furnace has a upper portion temperature of about 790° C., a middle portion temperature of about 780° C., and a lower portion temperature of about 770° C.

6. The method according to claim 3, wherein the carbon material is a fiber aggregate having a thickness of 1 to 50 cm.

7. The method according to claim 6, wherein the thickness is 3 to 20 cm.

* * * * *